United States Patent

[11] 3,597,861

| [72] | Inventor | Dewey J. Gordon |
| | | 120 Happy Acres Road, Los Gatos, Calif. 95030 |
| [21] | Appl. No. | 826,122 |
| [22] | Filed | May 20, 1969 |
| [45] | Patented | Aug. 10, 1971 |

[54] EDUCATIONAL DEVICE
4 Claims, 5 Drawing Figs.

[52] U.S. Cl. ................................................. 35/22 R, 40/16, 273/67 R
[51] Int. Cl. ...................................................... G09b 19/00, G09f 3/20, A63b 59/00
[50] Field of Search ............................................ 35/22, 21; 273/67, 76, 84; 40/5, 16, 62

[56] References Cited
UNITED STATES PATENTS

| 1,366,818 | 1/1921 | Meyerson | 40/16 X |
| 2,645,488 | 7/1953 | Jorgenson | 273/67 |

FOREIGN PATENTS

| 1,133,204 | 12/1956 | France | 273/76 |
| 607,255 | 8/1948 | Great Britain | 273/76 |

Primary Examiner—Wm. H. Grieb
Attorney—Paul B. Fihe

ABSTRACT: Disclosed herein is a paddle having a plurality of apertures through the main body portion of the paddle and a sign-holding frame disposed about the perimeter of said apertures on one side of the paddle.

Patented Aug. 10, 1971  3,597,861
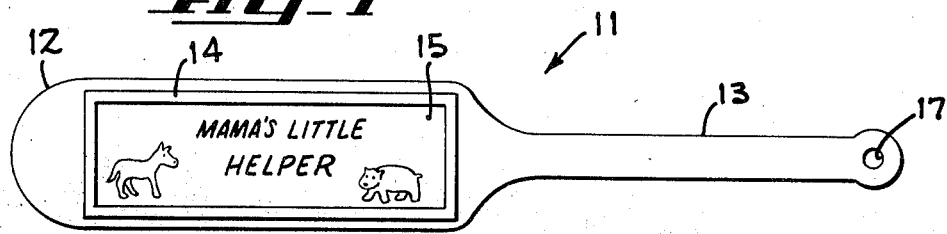
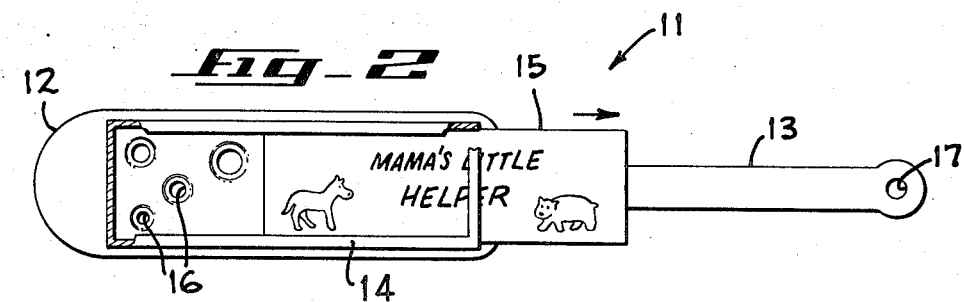
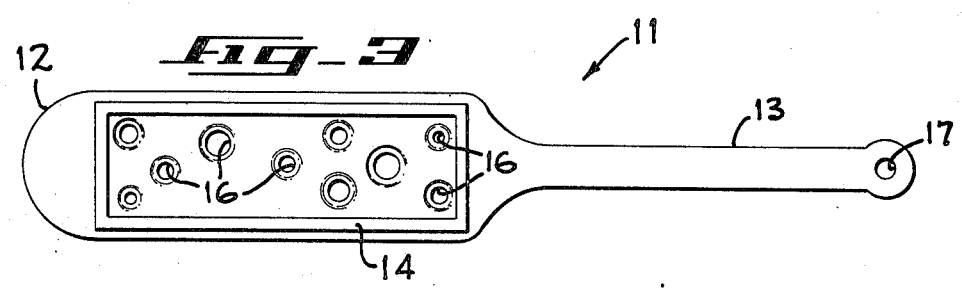
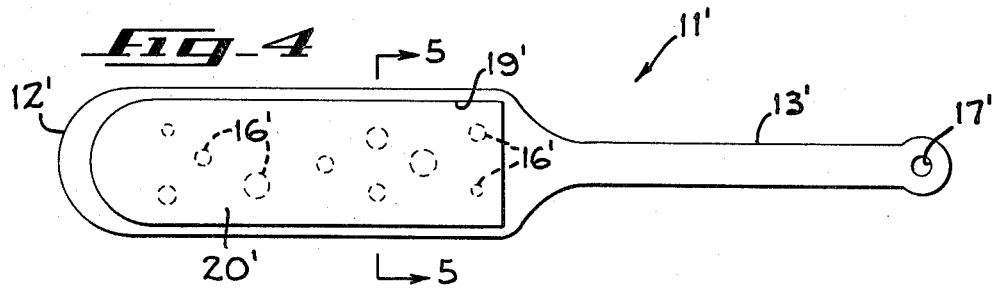
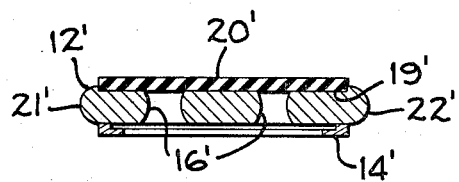
INVENTOR.
DEWEY J. GORDON
BY
PATENT AGENT

3,597,861

EDUCATIONAL DEVICE

BACKGROUND OF THE INVENTION

The invention relates to an apparatus for correcting children and more particularly to an apparatus which corrects children using psychological symbolism. Most parents use physical force in disciplining their children only as a last resort. It is usually considered preferable to give the child some indication of disapproval of his actions before physical force is used. A great number of parents threaten their children with various forms of punishment, only to find that threats are ineffective in bringing about a change in the child's behavioral patterns. Threats to children often go unheeded either because the child is aware that the threats will not be carried out or alternatively, because the child is uncertain of their meaning. Psychologists and writers often advise against the use of verbal threats since they usually prove to be ineffective and only result in diminished respect for parents. It is an object of the present invention to provide an apparatus which positively indicates messages of approval and disapproval to a child while simultaneously being useful for disciplining the child as an ultimate form of corrective communication.

SUMMARY OF THE INVENTION

The invention is a paddle having a substantially flat surface with a wide body portion and a narrow handle portion which may be conveniently grasped. The central area of the body portion includes a plurality of apertures of different diameters which are irregularly spaced. The irregularly spaced pattern of apertures stands out in contrast to the smoothly finished paddle body. A rectangular sign-holding frame is disposed on one side of the paddle completely surrounding the apertures previously described. Various types of messages can be placed in the frame for providing the paddle with a first configuration in which the apertures are covered by a message or symbol. The messages displayed by the paddle in its first configuration may be such as would be appropriate for indicating approval of a child's good or neutral activities. When the paddle is displayed in a prominent place and the sign is removed from its holder a child rapidly becomes aware of this changed status since the irregularly spaced apertures stand out on the paddle surface. In the event that the paddle is actually used as a physical correctional device a resilient pad is provided in a slot on the underside of the paddle for avoiding injury to the child.

The features of the invention will be apparent with reference to the drawings.

BRIEF DESCRIPTION OF THE DRAWINGS

FIG. 1 is a top view of the invention showing a sign positioned within the sign-holding frame.

FIG. 2 shows the apparatus of FIG. 1 wherein the sign is partially withdrawn from the sign-holding frame.

FIG. 3 shows the apparatus of FIG. 1 wherein the sign is totally withdrawn.

FIG. 4 is a bottom view of an alternate embodiment of the apparatus of FIG. 1.

FIG. 5 is a cross section of the invention taken along the lines 5-5 in FIG. 4.

In FIG. 1 the paddle 11 comprises a main body portion 12 and a handle portion 13. Both portions 12 and 13 are substantially flat with the handle portion 13 being suitable for gripping by a person's hand. The upper side of the paddle as shown in FIG. 1 includes a sign-holding frame 14 which covers most of the area of the paddle body portion 12. The frame 14 includes a lip on three sides for holding signs flat while having no lip on a fourth side so that signs may be inserted therethrough. The fourth open side is usually placed toward the handle so that a sign will be stretched flat while it is being inserted and withdrawn.

FIG. 2 shows a sign 15 in a partially withdrawn position. As the sign is withdrawn it exposes a plurality of apertures which are provided in the body portion of the paddle 11.

FIG. 3 shows the paddle of FIG. 1 with the sign fully removed. The apertures 16 existing in the body portion 12 of the paddle are irregularly spaced and have differing diameters. This helps achieve a psychological effect, principally creating a dramatic degree of contrast between the apertured paddle and the paddle with a sign displayed thereon. A child may be taught that the two configurations of the paddle are symbolic of his parents attitudes of approval and disapproval.

The apertures 16 are countersunk on both sides thereby providing rounded edges for the apertures on both sides of the paddle for avoiding injury to the child in the event of use of the paddle. A single aperture 17 is provided in the handle portion 13 of the paddle 11 so that the paddle may be conveniently displayed on a wall.

FIG. 4 shows the bottom side of an alternate embodiment of the present educational device. A slot defined by the line 19' in FIG. 4 is provided with a thin resilient insert 20' positioned to cushion the impact of the paddle 11'. The rubber insert 20' may extend slightly beyond the surrounding body portion of the paddle. The paddle, when used for corporeal correction of a child, is applied only on the side with the resilient insert 20'.

FIG. 5 is a cross section of the paddle shown in FIG. 4 taken along the lines 5-5. The paddle body portion 12' is shown with the countersunk apertures 16'. The sides of the countersunk apertures have a hyperbolic taper in cross section. The resilient insert 20' is shown projecting slightly beyond the paddle body in a recessed slot on the underside of said paddle. The frame 14' is shown extending across the top of the paddle body and covering the apertures 16'. The rounded edges 21' and 22' are provided along the entire periphery of the paddle for purposes of safety. The cross section shown in FIG. 5, although described with reference to FIG. 4, is essentially the same as the cross section of the apparatus shown in FIG. 1.

It has been found that the best practical materials for forming the paddle bodies are soft wood or plastics. Alternatively, any semiresilient material which is fairly lightweight may be substituted. Many alternate forms of the present invention may occur to the careful reader.

What I claim is:
1. An educational device comprising,
    a substantially flat paddle with a wide body portion and a narrow handle portion, said body portion defining a plurality of spaced apertures extending through said paddle body portion,
    a sign dimensioned to cover the apertures in said paddle body portion, and
    means on said paddle body portion for releasably holding said sign in covering position over said apertures.
2. The apparatus of claim 1 wherein the bottom of said body portion accommodates a rubber pad projecting outwardly from said paddle bottom.
3. The apparatus of claim 1 wherein said apertures extending through said paddle body are countersunk on both sides.
4. The apparatus of claim 1 wherein,
    said apertures are irregularly spaced and of differing diameters.